Oct. 24, 1950 — T. N. BOURKE — 2,526,629
SEAL STRUCTURE FOR CONTROLLING FLOW OF LIQUIDS
Filed Dec. 13, 1947 — 3 Sheets-Sheet 1

INVENTOR.
Thomas N. Bourke
BY
Barnes, Kisselle, Laughlin & Raisch
ATTORNEYS

Oct. 24, 1950 T. N. BOURKE 2,526,629
SEAL STRUCTURE FOR CONTROLLING FLOW OF LIQUIDS
Filed Dec. 13, 1947 3 Sheets-Sheet 2

INVENTOR.
Thomas N. Bourke
BY
Barnes, Kisselle, Laughlin & Raisch
ATTORNEYS.

Oct. 24, 1950     T. N. BOURKE     2,526,629
SEAL STRUCTURE FOR CONTROLLING FLOW OF LIQUIDS
Filed Dec. 13, 1947     3 Sheets-Sheet 3
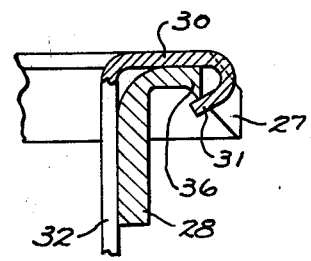
Fig. 5.
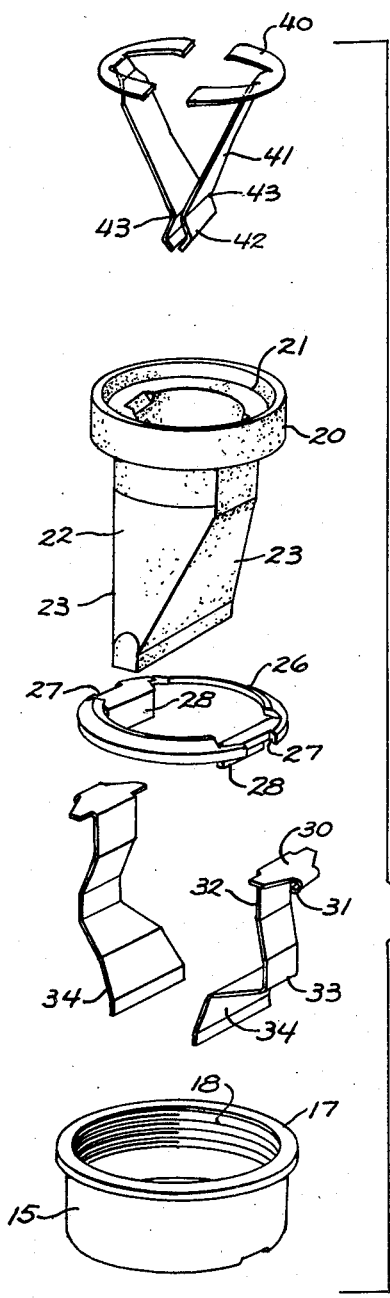
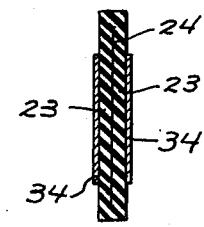
Fig. 7.
Fig. 6.
INVENTOR.
Thomas N. Bourke
BY
Barnes, Kisselle, Laughlin & Raisch
ATTORNEYS.

Patented Oct. 24, 1950

2,526,629

UNITED STATES PATENT OFFICE 2,526,629

SEAL STRUCTURE FOR CONTROLLING FLOW OF LIQUIDS

Thomas N. Bourke, Grosse Pointe, Mich.

Application December 13, 1947, Serial No. 791,575

7 Claims. (Cl. 284—14)

This invention relates to a seal or valve construction particularly useful in connection with the handling or storage of gas or liquids under pressure.

The structure of the present invention may be used in connection with the maintaining of or storage of liquids under pressure, such as a beverage, and also with apparatus for maintaining gas in the container under pressure, such as a gas either in a rigid metallic container or a flexible or collapsible container. A specific example of use is with kegs or other containers of beer.

An object of the invention is to provide an improved seal construction which may be opened and closed with the sealing element of plastic substance, such as natural or synthetic rubber, which will hold the pressure involved and which can be opened by inserting into the seal an element, such as a draft tube or other gas or liquid conduit. Further objects include the provision and arrangement to prevent sliding friction on the rubber element and to provide yieldable means for normally holding the rubber element closed. Since the seal construction is adaptable for use with kegs the following disclosure is made in connection with a container such as a keg for beer.

The invention is disclosed in the accompanying drawings:

Fig. 5 is an enlarged cross sectional view showing the application of one of the spring elements.

Fig. 6 is a composite view showing the several parts in separated relationship and illustrating the rubber sealing element, the anti-friction device, and the spring arrangement.

Fig. 7 is a sectional view taken on line 7—7 of Fig. 3 showing the seal closed.

Figure 1:
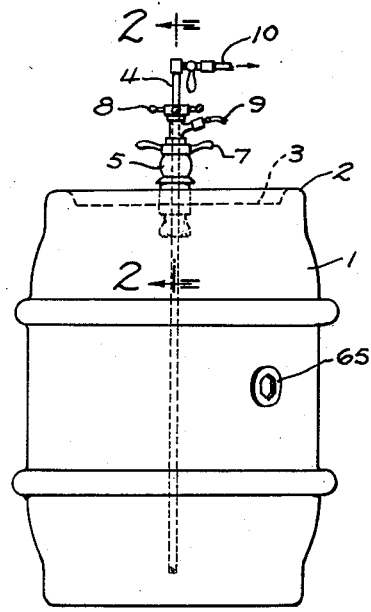
Fig. 1 is a general view showing a container with a tap applied thereto.

A container, such as a keg, is illustrated at 1, as being in the form of a metal keg, having a chimb 2 and a head 3. In Fig. 1 a so-called tap construction of rather well-known form is shown applied to the keg and this includes a draft tube 4 which projects into the keg and through a body 5 which is applicable to the seal structure of the present invention and may be tightened thereon by a handle 7. The draft tube is tightened in position by turning a handle 8. Air or carbon dioxide under pressure may be furnished through a connection 9 which is conducted into the keg outside the draft tube and the beer is drawn off through the draft tube and through a suitable conduit 10, the draft tube having in its lower end suitable inlet openings 11.

The seal structure of the present invention takes the form of a bushing 15 which has an inturned lower edge 16 and which may have an upper flange 17 which may be welded to the keg head 3. The bushing is internally threaded as at 18.

A molded valve element of plastic substance, aforesaid, and which, for convenience, will hereinafter be termed rubber, has an upper flange 20 recessed as at 21 and also recessed on its underside and depending from the flange is a formed tubular-like portion 22. This portion has inclined or tapered sides 23. The sealing element is formed so that normally its lower open end is closed as the opposite inclined walls 23 approach each other and come together in contact at the line 24 (Fig. 7).

Figure 2:
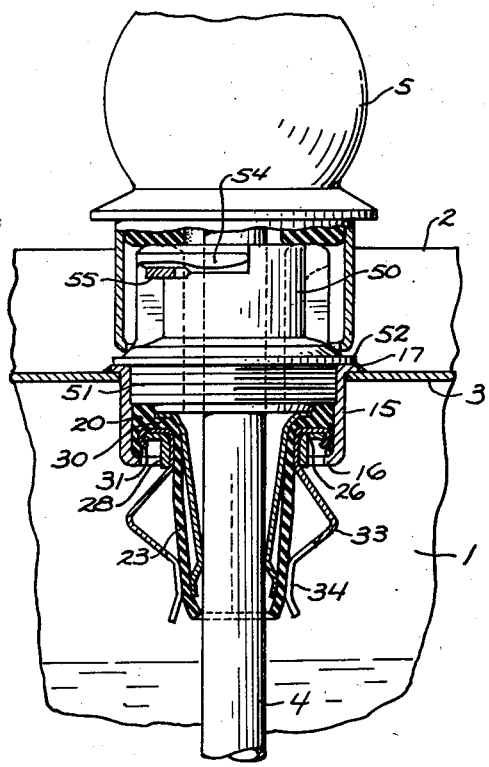
Fig. 2 is an enlarged cross sectional view taken through the seal construction showing the draft tube and tap in position.

There is a washer element 26 formed on opposite sides with grooves 27. The grooves 27 are in the outer portion of the washer while just opposite the grooves and on the inner edge of the washer are downwardly depending elements 28. A pair of spring fingers are used in conjunction with the washer. Each spring finger has a top portion 30 and a hook portion 31 and depending spring arms 32. The arms are fashioned to extend outwardly as at 33 and the inwardly with relatively enlarged end portions 34 which engage opposite sides of the lower end of the rubber sealing element as shown in Fig. 2. The two spring elements are identical and a description of one suffices for both. They are applied to the washer as shown in Fig. 5 with the hook portion 31 lying in the groove 27 and engaging under the adjacent part of the body of the washer, as shown at 36. The top portion extends over the washer and the spring arms 32 extend through the washer backed up against the depending lugs 28. With the spring arms thus mounted on the washer the lower ends are forced yieldably inwardly toward each other. In making an assembly the spring elements have to be mounted on the washer and then the rubber-element is passed therethrough so that the washer seats in the recessed underside of the flange 20. The lower ends of the spring arms engage the lower open end of the sealing element, as shown in Fig. 7, and yieldably urge the opposite wall portions 23 together with contact, as shown at 24, to close and seal the same.

A pair of metal friction elements are employed for lying inside the rubber sealing element. Each element has a substantially semi-circular flange portion 40 with a depending leg 41 suitably fashioned with an outwardly extending portion 42 at its lower end, thus forming a bend line 43. These elements are applied in reverse position and situated in the recess 21 of the flange 20, as shown in Fig. 2. Normally, when the seal structure is closed, the bend portions 43 may contact each other as illustrated in Fig. 3.

An attaching fitting 50 has a screw threaded portion 51 arranged to be screw threaded into the bushing 15 to seat upon the flange 20 and the fitting may also have a flange 52 for finally locating the fitting against the flange 17 of the bushing. This attaching fitting is constructed and arranged for quick detachable coupling with the body 5 of the tap construction for which purpose the attaching fitting may have lugs 54 for constituting part of a bayonet-type coupling with cooperating elements 55 on the body 5.

Figure 3:
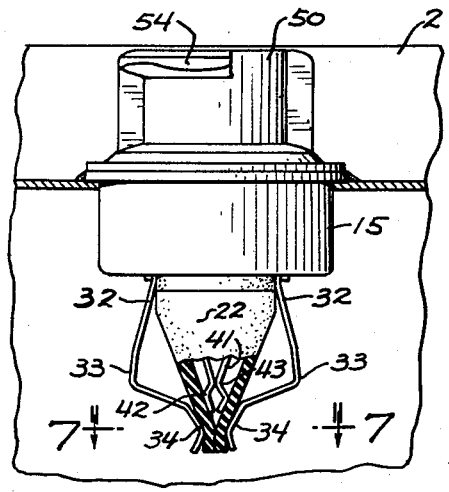
Fig. 3 is a partial sectional view showing the seal in closed position.
Figure 4:
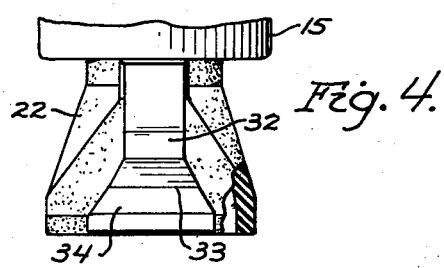
Fig. 4 is a view showing the side of the seal and showing part of the sealing element in section.

When the keg is being stored or in shipment, it is closed and sealed by the sealing element with the parts in the position shown in Fig. 3. The pressure in the keg, or the pressure which may develop in the keg, due to the fact that the beer or ale or other contents is charged with, or develops $CO_2$ gas, is adequately held and maintained in the keg by the sealing engagement of the rubber faces at the contact 24. When a draft tube is inserted, it is pushed downwardly through the coupling 50 and through the sealing element. In this action, the draft tube engages the portions 43 of the form shown in Fig. 3. This spreads the seal structure to open position as shown in Fig. 2, and as the tube slides into and out of position, it frictionally engages the metal elements thus eliminating frictional action on the rubber sealing faces. Thus, the sealing faces are prevented from being worn or abraded so that the sealing action will be maintained over a long period of time. The spreading action, in the form shown in Figs. 2 and 3, is against the yielding action of the spring arms 32. As above mentioned, the tap is locked into position by turning the nut 7 and the tube is sealed by turning the nut 8. The gas or air under pressure which enters the connection 9 passes downwardly outside the draft tube and enters the keg by flowing between the outer wall of the draft tube and the rubber seal construction. The seal construction does not engage the tube with sealing action when the tube is in position.

After the contents of the keg have been discharged, the draft tube is removed and as its end is pulled upwardly out of the structure, the rubber faces come together at the contact 24. This may be due, in part, to the fact that the rubber sealing element is originally molded in this form, but in any event the action is aided yieldably by the spring arms 32. Thus, instanter, upon removal of the draft tube the interior of the keg is sealed thus eliminating all possibility of dirt or other extraneous matter getting into the keg, and also preventing various insects or flies getting into the keg. When the keg has been returned to the brewery, its interior may be washed in the usual manner by flushing the same out as by removal of the bung 65 and this also washes the portions of the seal structure which are exposed to the interior of the keg. If desired, the open end of the coupling member 50 may be closed by the application of a cap during storage and transit of the keg when it is filled or when it is returned empty.

When the contents of the container are exhausted and the handle 7 of the tap is loosened the space around the draft tube is vented. Therefore, when the draft tube is removed and the valve structure closes, the container is sealed without internal pressure.

In the modified form some of the parts are the same as those previously described and the same reference characters are used. The bushing 15 is to be secured in the wall 70 of a suitable container and the bushing has the flange or lip 16. The fitting 50 is screw threaded into the bushing, after the manner above described.

Figure 8:
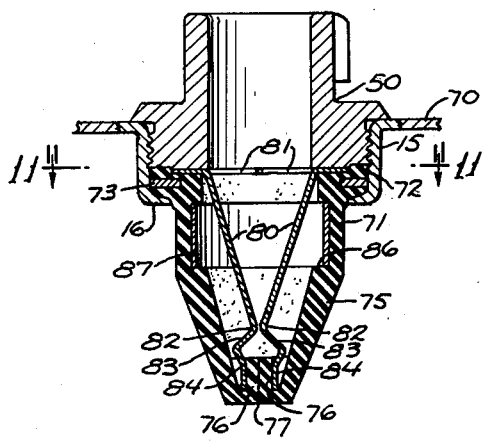
Fig. 8 is a sectional view illustrating another form of the invention.
Figure 9:
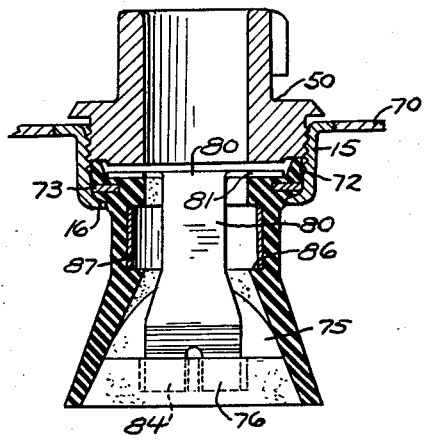
Fig. 9 is a view similar to Fig. 8 but taken at right angles thereto.
Figure 10:
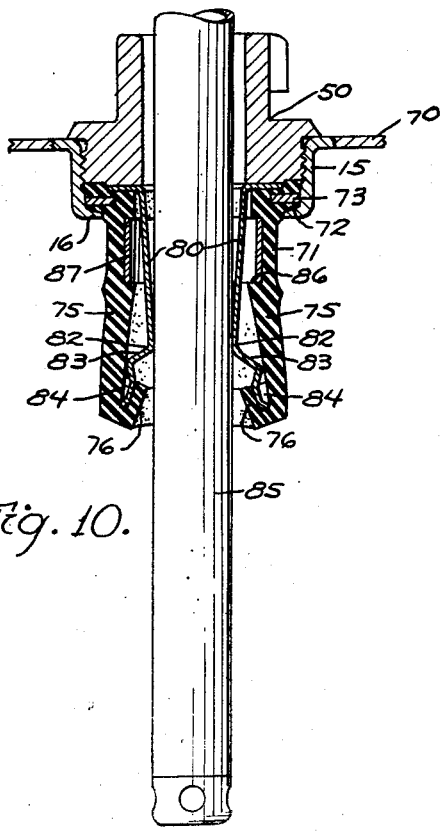
Fig. 10 is a view of a form of the invention shown in Fig. 8 showing an instrument passed into the same for opening the seal.
Figure 11:
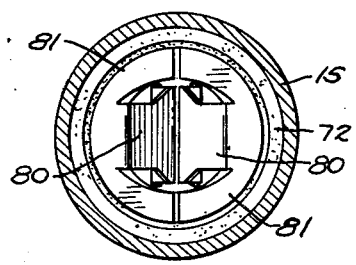
Fig. 11 is a sectional view taken substantially on line 11—11 of Fig. 8.

In this form the rubber sealing element has a body 71 with a flange 72 for seating on the lip 16. Inasmuch as it may be necessary to tightly clamp the flange 72 in position, it is reinforced to prevent its deformation and to prevent it from being contracted and pushed through the opening defined by the flange 16. To this end the flange 72 is provided with a peripheral groove for the reception of a rigid reinforcing ring 73, which may be metallic. The sealing element is of hollow construction and has tapering walls 75 and these walls have inwardly and upwardly extending lips 76, the faces of which come together in contact with each other as at 77 to provide the seal. Yieldable elements are provided for holding the faces of the lips together, such as two spring arms 80, each provided with a substantially semi-circular base 81 (Fig. 11) resting upon the flange 72 in a recess provided therefor, and held clamped by the member 50. The arms 80 extend downwardly as shown in Fig. 8 and have portions 82 which approach each other near the ends of the arms and the diverging portions 83, extending from which are end portions or fingers 84 which engage behind the lips 76. Thus, the spring arms 80 urge the lips together in sealed relationship. Also, these same spring arms serve as the friction means for engaging an element 85, such as a tube or the like, which may be inserted therein for opening the seal. When the element 85 is inserted into the seal, the structure opens up, as shown in Fig. 10, so that the contents of the container may flow out through a seal and specifically through the tube 85.

In order to reinforce the sealing member 71 against collapse in the event there is sufficient pressure in the container to cause or tend to cause collapse, the member is formed with a circumferential recess 86 for the reception of a reinforcing ring 87 placed therein. This ring may be of metal or other adequately strong and rigid material. In order for the sealing member to hold pressure, particularly when the pressure is low and approaches atmospheric, the faces which contact each other at 24 and at 77 must be smooth and uniform in order to provide a good surface to surface engagement. Accordingly, these faces should be molded. One way of making the sealing element is to mold it in two pieces and then vulcanize the two pieces together without vulcanizing the faces which contact at 24 and 77. Another manner of procedure is to separate the lower or tapered end of the element while it is being molded and then vulcanize or otherwise secure the separated parts together except for the contacting faces.

While, as above stated, the disclosure has been made with reference to kegs or containers for beer, which, as is well known, is a liquid beverage held under gaseous pressure, this is but one example of the use of the seal. Moreover, the internal pressure with which the seal is used need be no more than atmospheric pressure and the structure is admirably adapted for use, including the form shown in Fig. 8, where a fluid, either a gas or liquid, is to be held in a container and the container may be of rigid geometric form or may be a collapsible container in the nature of a bag of flexible or fabric-like material which can be folded compactly when not in use.

I claim:

1. In a seal structure for a container adapted to hold fluid under pressure, a bushing adapted to be mounted in a wall of the container, said bushing having an inwardly extending lip at its inner end, a sealing member of flexible plastic having a flange located in the bushing and having a tubular extension projecting into the container, the inner end of the tubular extension being of flattened form so that surfaces of the tubular wall come together in face to face engagement to provide a seal, a pair of members, each having a partial flange at one end disposed upon the flange of the sealing member, said members having yieldable arms projecting into the tubular extension and adapted to frictionally engage an element inserted therein and extracted therefrom, and a member screw threaded into the bushing and holding the flange of the sealing member and the partial flange portions of said members in position.

2. A seal structure for an opening in a pressure container and operable for controlling flow of liquid through said opening comprising a hollow sealing member of flexible material adapted to be secured and sealed in said opening and having a portion projecting into said container, means removably securing and sealing said sealing member in said opening, the inner end of said portion having interengaging flat faces in sealing relation and defining a normally closed slit between said faces, said hollow sealing member being provided on its interior with yieldable opposed spring arms diverging outwardly from adjacent said faces and having their free ends in close proximity to said faces and spanning the inner end of said sealing member so as to prevent a tubular element inserted through said opening into said sealing member from engaging said surfaces, said spring means preventing collapse of said sealing member under the pressure in said container and during inserting movement of said tubular element being engageable thereby to expand opposite walls of said sealing member to open said slit so as to permit said tubular element to pass freely therethrough.

3. Seal structure according to claim 2 wherein said sealing member is provided with a flange forming part of a means for securing said sealing member in said opening, said flange having a channel therein, and a reinforcing ring disposed on the outside of said sealing member is associated with said flange and arranged in said channel.

4. A seal structure substantially as described comprising, a bushing member for mounting in a wall of a container and having an inwardly extending lip in its inner end, a seal member of flexible plastic having a flange fitting in the bushing and having a tubular extension projecting into the container which is flattened at its inner end so that surfaces of the tubular wall come together in face to face relationship, a washer in the bushing positioned under said flange, said washer having oppositely disposed cut out portions, a pair of spring elements each having an end arranged to detachably engage the washer at the cut out portions and each having a spring arm extending into the keg, said spring arms being bowed outwardly and then inwardly and arranged to engage the inner end of the sealing element to hold the surface in said face to face engagement to provide a seal, and means positioned inside the tubular sealing element for engagement with a draft tube to thereby protect the material of the sealing element from frictional engagement with the draft tube as the same is inserted and extracted from the container.

5. A seal structure substantially as described comprising, a bushing for mounting in a wall of a container and having an inwardly extending lip in its inner end, a seal member of flexible plastic having a flange fitting in the bushing and having a tubular extension projecting into the container which is flattened at its inner end so that surfaces of the tubular wall come together in face to face relationship, a washer in the bushing positioned under said flange, a pair of spring arms having hook-shaped ends adapted to pass through the washer with the hook-shaped ends detachably engaged with the washer, said spring arms being of bowed construction and having the opposite ends engaging the tubular sealing element to hold the said surfaces in face to face engagement yieldably to provide a seal, and means within the tubular sealing element for frictional engagement with a draft tube as the same is inserted into and extracted from the container.

6. A seal structure substantially as described comprising, a bushing for mounting in a wall of a container and having an inwardly extending lip in its inner end, a seal member of flexible plastic having a flange fitting in the bushing and having a tubular extension projecting into the container which is flattened at its inner end so that surfaces of the tubular wall come together in face to face relationship, a washer in the bushing positioned under said flange, a pair of spring arms having hook-shaped ends adapted to pass through the washer with the hook-shaped ends detachably engaged with the washer, said spring arms being of bowed construction and having the opposite ends engaging the tubular sealing element to hold the said surfaces in face to face engagement yieldably to provide a seal, a pair of elements each having an end portion for resting upon the flange of the tubular element and each having an arm extending into the tubular element for engaging a draft tube as the same is inserted into and extracted from the container to protect the plastic sealing element from frictional engagement with the draft tube.

7. A seal structure substantially as described comprising, a bushing for mounting in a wall of a container and having an inwardly turned lip, a washer in the bushing resting upon the lip, a pair of spring arms having end portions of hook formation in engagement with the washer, a sealing member of flexible plastic having a flange resting upon the washer and having a tubular extension projecting into the container between the spring arms, said spring arms engaging the inner end of the sealing member and holding the tubular form flattened with surfaces of its wall in face to face engagement to provide a seal, a pair of friction members each having a segment of a flange resting upon the flange of the sealing member and having arms projecting into the tubular sealing member for frictional engagement with the draft tube as a draft tube is pushed into and pulled out of the container to thereby protect the plastic sealing member with frictional engagement with the draft tube, and a coupling member screw threaded into the bushing for holding the washer, the flange of the sealing member and the segmental flange portions of the friction elements in assembled relationship.

THOMAS N. BOURKE.

REFERENCES CITED

The following references are of record in the file of this patent:

UNITED STATES PATENTS

| Number | Name | Date |
|---|---|---|
| 2,033,786 | Rice | Mar. 10, 1936 |